July 13, 1926.
J. R. BLAINE
FLEXIBLE COUPLING FOR SHAFTS
Filed May 24, 1923    2 Sheets-Sheet 1
1,592,254
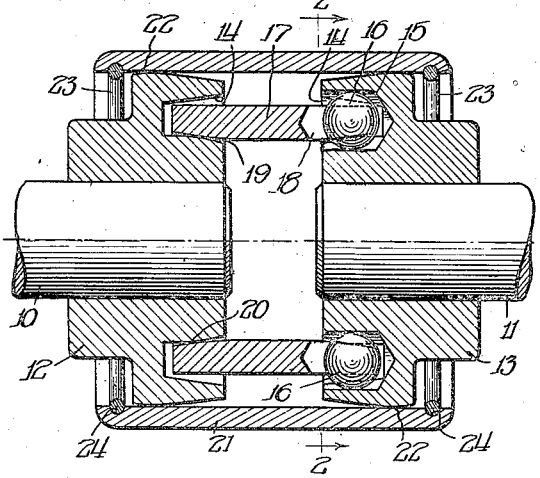
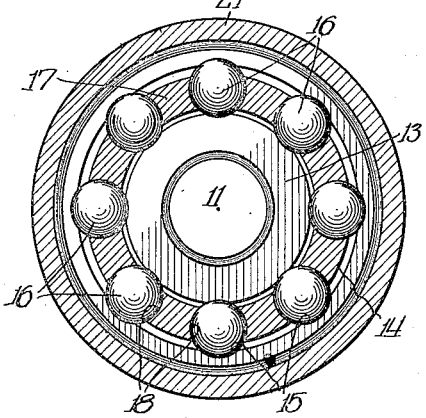
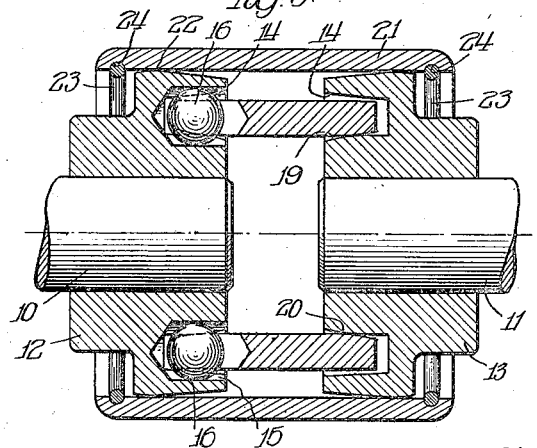
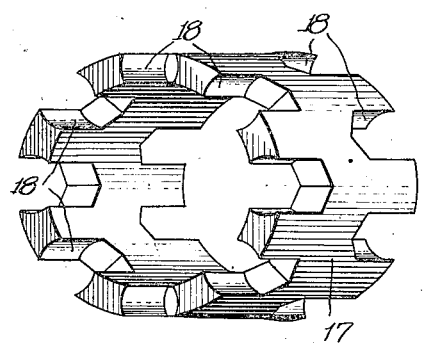
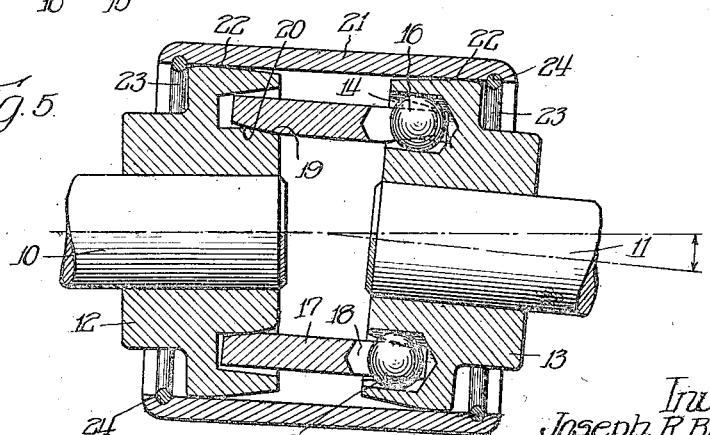
Witness:
P. Burkhardt
Inventor:
Joseph R. Blaine,
By Wilkinson, Huxley, Byron & Knight
Attys.

July 13, 1926.                                                              1,592,254
J. R. BLAINE
FLEXIBLE COUPLING FOR SHAFTS
Filed May 24, 1923          2 Sheets-Sheet 2
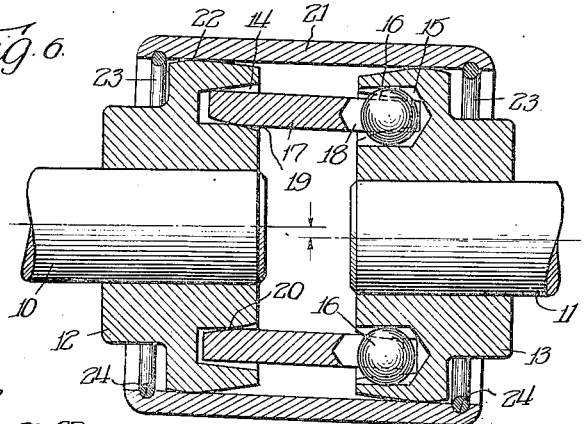
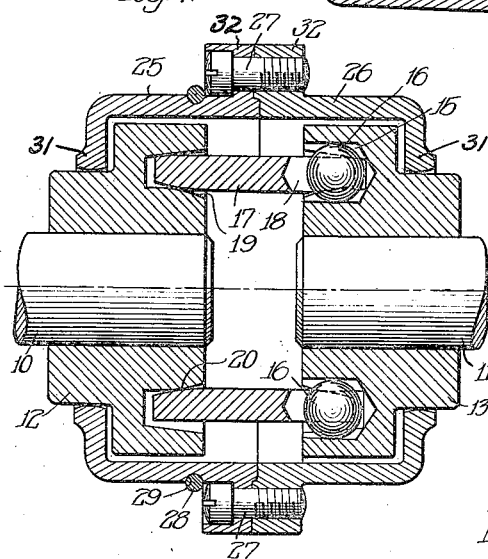
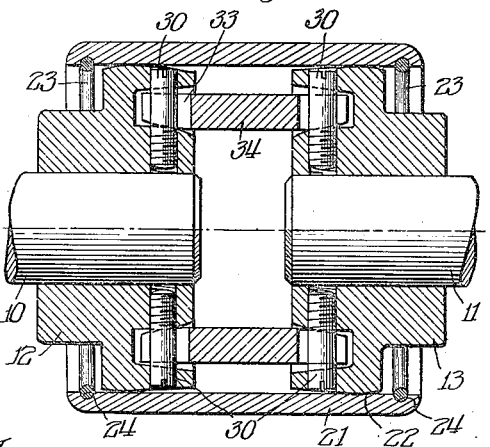
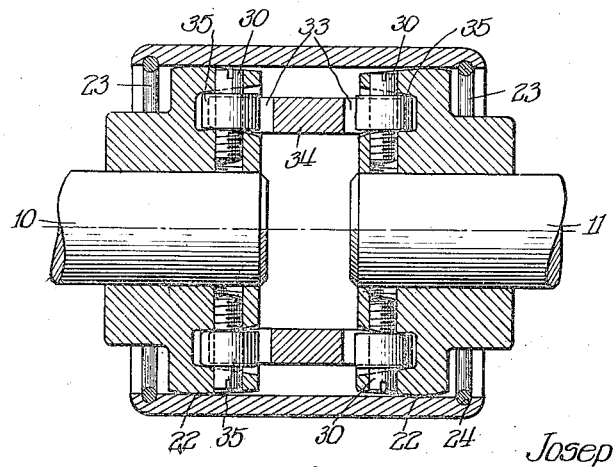
Witness:
R. Burkhardt
Inventor:
Joseph R. Blaine,
By Wilkinson, Huxley, Byron & Knight
Attys.

Patented July 13, 1926.

1,592,254

UNITED STATES PATENT OFFICE.

JOSEPH R. BLAINE, OF OAK PARK, ILLINOIS.

FLEXIBLE COUPLING FOR SHAFTS.

Application filed May 24, 1923. Serial No. 641,157.

This invention relates to a flexible coupling for shafts.

A study of the present types of flexible couplings shows that there are many. However, all of such flexible couplings come under four general classes.

The first class is the flexible coupling including a member of fibre, leather, rubber or fabric interposed between flanges. This type of coupling does not have the universal requirements in that it cannot withstand all conditions of weather or service, neither is it adapted to large units where a great amount of power is to be transmitted. Its life is rather limited and the flexible parts must be often renewed.

The second type is an all metal type wherein parts of the driving members must slide and bend to compensate for misalignment. This type has the objection that sliding and bending occur under strain causing excessive friction and crystallization.

The third type is an all metal type wherein gear teeth rock with respect to each other and must have enough clearance therebetween to allow for flexibility. This type depends for its action upon the amount of clearance in the mesh of the gears resulting in lost motion or back-lash. Another objection is that some of the teeth always assume a twisted position in transmitting the load. In other words the strain comes on opposite diagonal corners of the teeth. This, of course, is undesirable. Furthermore in this type the misalignment results in a sliding action of the teeth on each other which is bad especially under the strain of a load.

The fourth type is an all metal type wherein the drive is through one or more springs strong enough to transmit the entire load. While this type is probably the simplest, it will be appreciated that it is limited in size since springs large enough to transmit any great amount of power would be so stiff as to be inflexible for reasonable practical dimensions. Also there is the possibility of crystallization of the driving member.

Accordingly one object of my invention is to provide a flexible coupling which overcomes the objections above mentioned.

Another object is to provide a simple, inexpensive, durable and efficient flexible coupling in which there are no bending members, back-lash, twist, sliding under load, no limit as to size and in which friction is reduced to a minimum.

Another object is to provide a highly efficient flexible coupling which is universal in its action and adapted to meet all of the requirements of commercial use.

These and other objects are accomplished by means of the arrangement disclosed on the accompanying sheets of drawings, in which—

Figure 1 is a longitudinal sectional view through my flexible coupling;

Figure 2 is a sectional view taken in the plane of line 2—2 of Figure 1;

Figure 3 is a sectional view of the same coupling similar to the sectional view shown in Figure 1, indicating the staggered relationship of the bearing balls receiving grooves in the members secured to the shafts;

Figure 4 is a perspective view of the intermediate power transmitting member;

Figure 5 is a sectional view of the coupling similar to the view shown in Figure 1 but showing the connected shafts at an angle with respect to each other;

Figure 6 is a sectional view of the flexible coupling similar to Figure 1 but showing the shafts in parallelism and eccentrically arranged;

Figure 7 is a sectional view somewhat similar to Figure 1 but showing a modification of the outer shell or casing; and Figures 8 and 9 are longitudinal sectional views of flexible couplings embodying modifications of my invention.

The various novel features of the invention will be apparent from the following description and drawings and will be particularly pointed out in the appended claims.

Referring generally to all of the drawings it will be noted that my flexible coupling is arranged to connect two adjacently arranged shafts 10 and 11. Secured to the shafts 10 and 11, respectively, are shaft end members or collars 12 and 13, which, in each instance, are duplicates of each other. Each of the collars 12 and 13 is provided with an annular undercut groove 14. These grooves 14, when the collars 12 and 13 are assembled, face each other. Each annular groove 14 is provided with a plurality of circumferentially spaced recesses 15 in the walls thereof for the reception of bearing balls 16, as shown in all figures of the drawings with the exception of Figures 4, 8 and 9. By providing these recesses 15 the bearing balls 16 are definitely positioned circumferentially with respect to each other. The walls of the recesses 15 are arcuately made and cylindrically concave longitudinally of the collars 12 and 13 for permitting a limited lengthwise rolling or floating movement of the bearing balls 16 in said recesses when such movement is necessary under shaft misalignment conditions or if there is a relative endwise movement of the connected shafts. The bearing balls 16 have no lost motion with respect to the recesses 15 circumferentially so that back-lash between said parts is prevented.

For connecting the collar members 12 and 13 and accordingly shafts 10 and 11 there is provided an intermediate power transmitting member in the form of a shell 17 each end of which is provided with a plurality of circumferentially spaced slots 18, as shown particularly in Figures 1 to 7 inclusive. The walls of these slots 18 are cylindrically concave for receiving the bearing balls 16, and they permit longitudinal rolling or floating movement of said balls. Here again there is no lost motion circumferentially between the bearing balls 16 and the walls of the slots 18 and accordingly backlash between said parts is prevented. As shown in said figures of the drawings it will be noted that the slots 18 at one end of the shell are staggered with respect to the slots at opposite end of the shell and that the said slots extend for considerable depth toward the middle of said shell for making the member 17 relatively short so that the ends of shafts 10 and 11 may be relatively close to each other. Under the circumstances it will be appreciated, of course, that the bearing balls 16 in one collar member 12 may be offset circumferentially with respect to the bearing balls 16 in the other collar member 13. As shown in Figures 1, 2 and 7 the shafts 10 and 11 are in alignment with respect to each other so that the said shafts are connected to each other under the most ideal circumstances.

In Figure 5 the shafts 10 and 11 are out of alignment with each other and more particularly extend at an angle with respect to each other. To facilitate the operation of the flexible coupling and to prevent any binding therein the inner annular wall of the groove 14 is convexly tapered or curved inwardly to form approximately a spherical surface as shown at 19 and similarly the inner end surfaces of the shell 17 are convexly curved as shown at 20, to permit a rocking or centering contact of the intermediate drive member 17 with respect to the collar members 12 and 13 when the shafts are out of alignment. In this way binding is prevented.

Mounted over the collars 12 and 13 is a cylindrical floating casing 21 the inner surface of which is engaged by spherically curved portions 22 of the collar members 12 and 13 also to permit angling of the parts without any binding action whatsoever. The casing 21 is held in place over collar members 12 and 13 by spring locking rings 23 which, when in place, occupy grooves 24 in the casing 21. All of the space within the casing 21 and between the collar members 12 and 13 may be occupied by any suitable lubricant.

In Figure 6 the same arrangement as shown in the preceding figures is shown with the exception that shafts 10 and 11 are eccentrically arranged; that is parallel but out-of-line, various other parts taking corresponding positions.

A slight modification is shown in Figure 7 in which, instead of providing the one piece cylindrical casing 21, a two piece casing is provided, said casing members 25 and 26 having inwardly extending annular retaining flanges 31 and other flanges 32 which are secured to each other by machine screws 27, the machine screws being locked in place by an annular spring ring 28 occupying a groove 29 in one of the casing members 25. In this modification, the casing is centered by means of the co-operative action of the end flanges 31 and the collar members 12 and 13. The inner portions of the flanges 31 are convexly curved to permit misalignment of the shafts without cramping or binding. This arrangement also provides for holding a greater amount of lubricant.

Instead of using ball bearings as shown in Figures 1 to 7 inclusive, pins 30 may be used, as shown in Figure 8, such pins extending radially and spanning the grooves 14, the slots 33 in the intermediate driving member 34 receiving said pins 30 for operatively connecting the shafts 10 and 11. The pins 30 in the members 12 and 13 may be staggered with respect to each other or not as may be desired.

Substantially the same arrangement is shown in Figure 9 with the exception that roller bearings 35 are mounted on pins 30 and are received within the slots 33 of the intermediate driving member 34.

By means of the arrangement hereinabove described, a flexible coupling is provided which avoids all undue strain in connecting units, friction is practically eliminated and accordingly hot bearings made impossible, all wear and deflection is compensated for and generally all troubles from misalignment of the shafts are obviated. Furthermore this flexible coupler is simple in construction, requiring a minimum amount of time and labor in assembling the parts to the shafts to be connected.

It is my intention to cover all modifications of the invention falling within the spirit and scope of the following claims.

I claim:

1. A shaft coupling comprising members to be secured to the shafts to be connected and having recesses in the faces thereof, an intermediate power transmitting member with slots in the ends thereof, and means occupying associated recesses and slots in said members and having longitudinal movements in said recesses and slots for compensating for any misalignment of the shafts.

2. A shaft coupling comprising members to be secured to the shafts to be connected and having recesses in the faces thereof, an intermediate power transmitting member having cooperating portions associated with said recesses, and means movable longitudinally in said recesses and movable with respect to said cooperating portions for operatively connecting said members for flexibly connecting shafts.

3. A shaft coupling comprising members to be secured to the shafts to be connected and having recesses in the faces thereof, an intermediate power transmitting member with slots in the ends thereof, and anti-friction means longitudinally movable in said recesses and slots and cooperating with said members and intermediate member for flexibly connecting shafts.

4. A shaft coupling comprising members to be secured to the shafts to be connected, each having an annular groove with recesses in the faces thereof, an intermediate power transmitting member with slots in the ends thereof, and anti-friction means mounted in associated recesses and slots for flexibly connecting shafts.

5. A shaft coupling comprising members to be secured to the shafts to be connected, each having an annular groove with recesses in the faces thereof, an intermediate power transmitting member with slots in the ends thereof, and anti-friction means mounted in associated recesses and slots for flexibly connecting shafts, the inner walls of each of said grooves being tapered inwardly to prevent cramping and to accommodate shafts which are out of alignment.

6. A shaft coupling comprising members to be secured to the shafts to be connected, each having an annular groove with recesses therein, an intermediate power transmitting member with slots therein, anti-friction means mounted in associated recesses and slots for flexibly connecting shafts, the inner walls of the annular grooves and inner surface of said transmitting member being tapered to prevent cramping and to accommodate shafts which are out of alignment, and a casing surrounding said first mentioned members and having a surface for centering the casing with the outer annular surfaces of said first mentioned members also to prevent cramping action where shafts out of alignment are coupled.

7. A shaft coupling comprising members to be secured to the shafts to be connected, each having an annular groove with recesses in the faces thereof, an intermediate power transmitting member with slots in the ends thereof, and ball bearings occupying associated recesses and slots in said members and intermediate member for flexibly connecting shafts.

8. A shaft coupling comprising members to be secured to the shafts to be connected, each having an annular groove with recesses therein, an intermediate power transmitting member with slots therein, ball bearings occupying associated recesses and slots in said members and intermediate member for flexibly connecting shafts, and a casing surrounding said first mentioned members for containing a lubricant, said casing and certain portions of said first mentioned members having surfaces for centering the casing permitting the connected shafts to be out of alignment without causing any cramping action.

9. A shaft coupling comprising members to be secured to the shafts to be connected, each having an annular groove with recesses therein having cylindrically concave walls, an intermediate power transmitting member having slots with cylindrically concave walls, and ball bearings mounted within associated recesses of said first mentioned members and slots of said intermediate member and engaging said concave walls for flexibly connecting a plurality of shafts and preventing any back-lash.

10. A shaft coupling comprising members to be secured to the shafts to be connected, each having an annular groove with recesses therein having cylindrically concave walls, an intermediate power transmitting member having slots with cylindrically concave walls, ball bearings mounted within associated recesses of said first mentioned members and slots of said intermediate member and engaging said concave walls for flexibly connecting a plurality of shafts and preventing any back-lash, said first mentioned members and intermediate member having cooperating convex engaging surfaces giving a centering contact with respect to each other for preventing any cramping of parts when the connected shafts are out of alignment.

11. A shaft coupling comprising members to be secured to the shafts to be connected, each having an annular groove with recesses therein having cylindrically concave walls, an intermediate power transmitting member having slots with cylindrically concave walls, ball bearings mounted within associated recesses of said first mentioned members and slots of said intermediate member and engaging said concave walls for flexibly connecting a plurality of shafts and preventing any back-lash, said first mentioned members and intermediate member having cooperating convex engaging surfaces giving a centering contact with respect to each other for preventing any cramping of parts when the connected shafts are out of alignment, and a casing surrounding said first mentioned members and having centering contact therewith also for preventing any cramping action therebetween when the connected shafts are out of alignment.

12. A shaft coupling comprising members to be secured to the shafts to be connected, each having recesses in the faces thereof, an intermediate power transmitting member with slots in the ends thereof, means longitudinally movable in associated recesses and slots in said members for flexibly connecting shafts, a casing surrounding said first mentioned members for forming a lubricant chamber, and means for releasably locking said casing in position.

13. A shaft coupling comprising two members with annular grooves having a series of recesses in the walls of said grooves, an intermediate connecting member the opposite ends of which enter the annular grooves, there being slots in the opposite ends of said connecting member which corresponds with said recesses, and members mounted in the recesses and slots to form a flexible compensating driving connection.

14. A shaft coupling comprising members to be secured to the shafts to be connected, each having recesses in the faces thereof, an intermediate power transmitting member with slots in the ends thereof, means longitudinally movable in associated recesses and slots in said members for flexibly connecting shafts, and a casing surrounding said first mentioned members and having inwardly extending flanges with curved surfaces for cooperating with said members to permit misalignment of the shafts without cramping and forming a lubricant chamber.

15. A flexible shaft coupling comprising members to be secured to the shafts to be connected and having grooves in their end faces, an intermediate power transmitting member the ends of which project into said grooves and have slots therein, and means occupying associated grooves and slots respectively for flexibly connecting shafts.

Signed at Chicago, Illinois, this 19th day of May, 1923.

JOSEPH R. BLAINE.